United States Patent [19]

Aizawa

[11] 4,044,182
[45] Aug. 23, 1977

[54] VENEER CORE BLOCK FOR PLYWOOD AND METHOD FOR FORMING SAME

[75] Inventor: Noboru Aizawa, Anjo, Japan

[73] Assignee: Hashimoto Denki Co., Ltd., Takahama, Japan

[21] Appl. No.: 694,038

[22] Filed: June 8, 1976

[30] Foreign Application Priority Data

June 14, 1975   Japan .................................. 50-71447

[51] Int. Cl.$^2$ ....................... B32B 3/10; B32B 29/02; B27F 7/00
[52] U.S. Cl. ..................................... 428/44; 428/58; 428/60; 156/176; 156/178; 156/257; 156/298; 144/318
[58] Field of Search ....................... 428/44, 53, 57, 58, 428/60; 156/176, 178, 298, 257; 144/318, 314 R

[56] References Cited

U.S. PATENT DOCUMENTS

| 1,744,203 | 1/1930 | Becker | 144/318 |
| 3,490,974 | 1/1970 | Jacobson | 156/176 |
| 3,607,562 | 9/1971 | Brenneman et al. | 156/178 |
| 3,705,829 | 12/1972 | Brenneman et al. | 156/178 |

Primary Examiner—George F. Lesmes
Assistant Examiner—William R. Dixon, Jr.
Attorney, Agent, or Firm—Wenderoth, Lind & Ponack

[57] ABSTRACT

A plurality of green veneer strips are positioned side by side in close contact and provided with inclined grooves or slits on the surface. Strings are embedded in the slits together with an adhesive for connecting the green veneer strips into a veneer core block for plywood.

8 Claims, 5 Drawing Figures

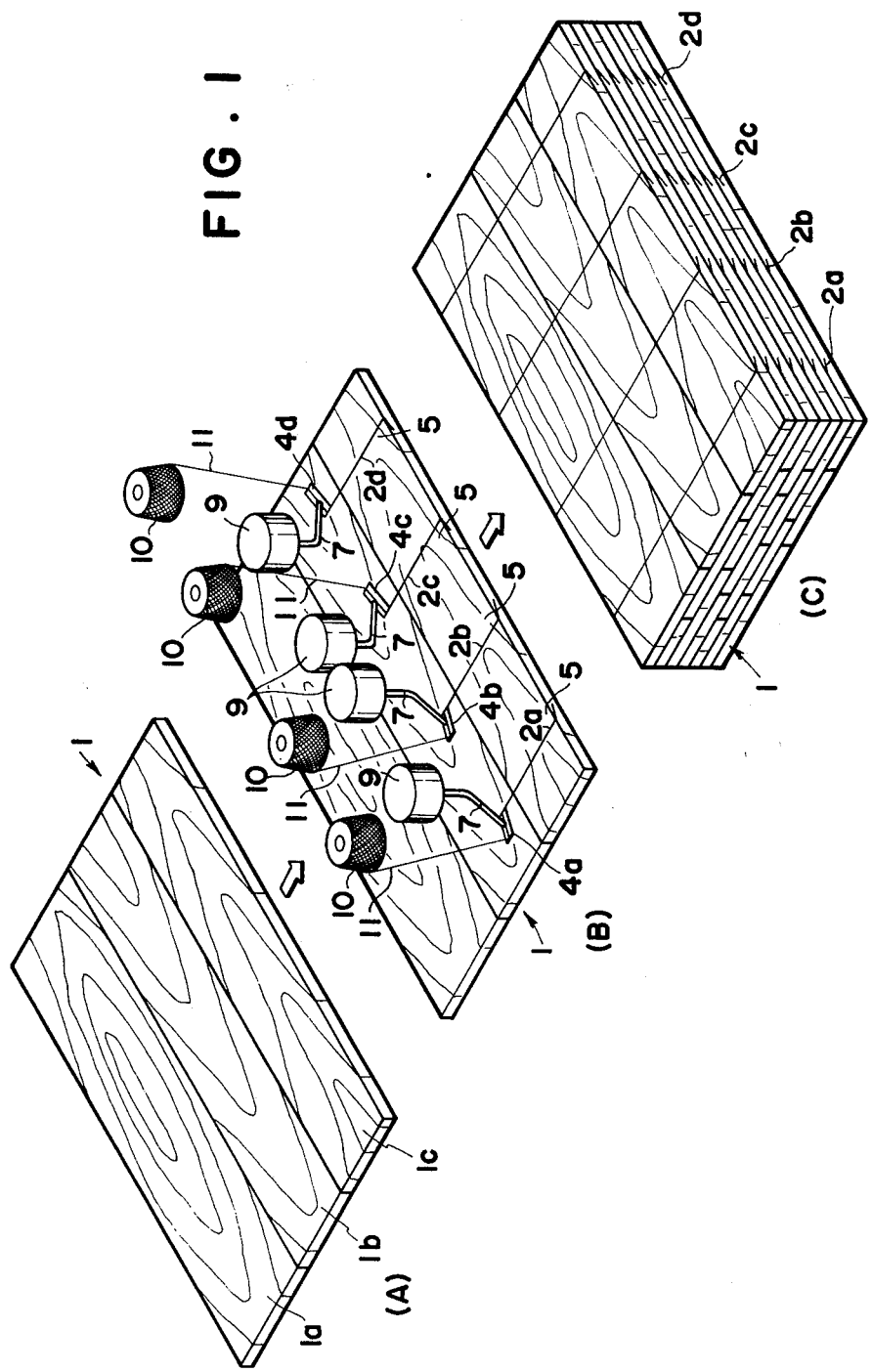

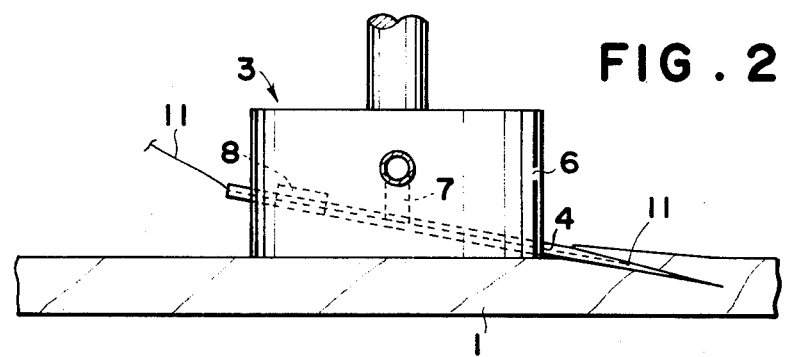
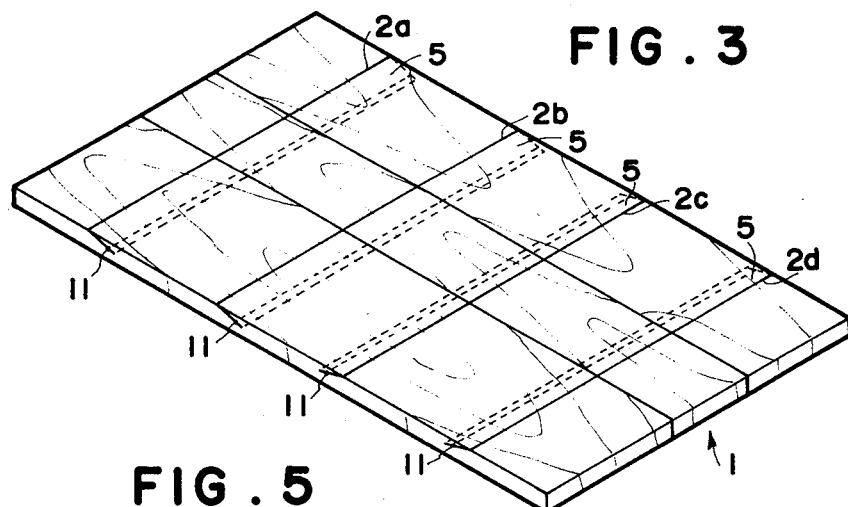
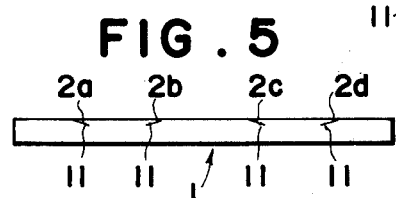
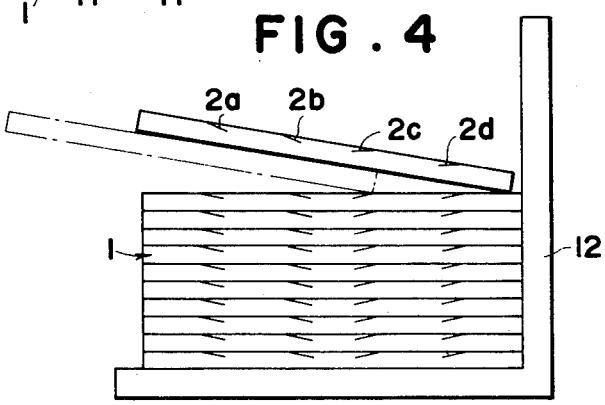

VENEER CORE BLOCK FOR PLYWOOD AND METHOD FOR FORMING SAME

BACKGROUND OF THE INVENTION

The present invention relates to a veneer core block for plywood and particularly to green veneer plates or strips, which have been formed by cutting a thin wood sheet to a maximum effective width by means of a veneer lathe, a veneer slicer, etc., for a veneer core block used for plywood. The present invention also relates to a method for forming a veneer core block and more particularly to method for connecting or linking green veneer strips side by side to form a veneer core block for plywood.

Many kinds of plywood have been provided hitherto having desired rigidity, hardness, or strength. Among these known plywoods, there has recently been provided a rigid plywood which comprises a veneer core block having a number of thin and narrow wood strips adhered side by side with their grains in the same direction, and relatively wide backing plates attached to the upper and lower surfaces of the veneer core block. In order to form plywood of this type, a number of wood strips are cut out of a thin wood sheet with a maximum effective width and the cut-out wood strips are arranged side by side and then adhered in a close contact with each other.

Generally, veneer core blocks for plywood have been formed by sewing green veneer strips which are closely contacted as described above or by affixing an adhesive tape on the surface of the closely contacted green veneer strips. In another method which has generally been applied, the veneer core blocks have been formed by providing a suitable adhesive agent on the entire surface of the opposing sides of the closely contacted green veneer strips, thereby establishing a side-by-side connection or linking of the green veneer strips to form a veneer core block for plywood.

However, it has been found that the conventional methods in which the green veneer strips are connected by strings or adhesive tapes produced such disadvantages that the methods lack efficiency and the connection of the green veneer strips is unstable. Further, the strings and adhesive tapes used for connecting the green veneer strips have been found to be objectionable particularly when thin wood backing sheets are adhered to the upper and lower surfaces of the connected green veneer strips for forming the desired plywood since the strings and tapes are exposed on the surfaces of the veneer strips and produce an objectionable unevenness or roughness on the surfaces thereof.

In the conventional method in which a desired adhesive agent is applied to the opposing sides of the green veneer strips which are in a close contact with each other, it has been found that the adhesive agent is often forced out of the surfaces of the green veneer strips and comes out from between the closely contacted sides of the veneer strips to result in an objectionable adhesion or connection with upper and lower green veneer strips when the green veneer strips are piled after the connection operation is finished. In order to overcome this objection, an attempt has been made in which sheets made of polyethylene or the like are inserted between the layers of the piled green veneer strips, i.e., veneer core blocks, to prevent the undesired adhesion between the upper and lower veneer core blocks. However, it has been found that this is time-consuming, troublesome and expensive, and requires complex steps.

Accordingly, an object of the present invention is to provide a veneer core block for plywood wherein a stable connection of green veneer strips is accomplished.

Another object of the present invention is to provide an economical veneer core block for plywood wherein a simple operation allows production of the core block.

A further object of the present invention is to provide a veneer core block for plywood wherein the core block has smooth surfaces.

Another object of the present invention is to provide a new method for forming a veneer core block for plywood.

Another object of the present invention is to provide a method which makes it possible to form a veneer core block for plywood efficiently and economically.

A further object of the present invention is to provide a method for forming a veneer core block which has smooth upper and lower surfaces.

BRIEF SUMMARY OF THE INVENTION

According the present invention, there is provided a veneer core block for plywood, which has a plurality of green veneer strips closely connected side by side. Inclined slits are formed on the surface of the closely contacted green strips and strings are embedded in the slits together with an adhesive, thereby connecting the green veneer strips to form a veneer core block.

According to the present invention, there is provided a method for forming a veneer core block for plywood, comprising the steps of forming inclined slits in the closely contacted green veneer strips and embedding strings in the slits together with an adhesive agent.

DESCRIPTION OF THE DRAWINGS

FIG. 1 is an explanatory perspective view showing steps of connecting green veneer strips to form a core block for plywood, FIG. 2 is a simplified sectional view of a cutting device for forming a continuous inclined cut or slit on the surface of the green veneer strips arranged in a jaxtaposed relation as shown by at (A) of FIG. 1, FIG. 3 is a perspective view of a veneer core block formed by the method of the present invention, FIG. 4 is a side view of veneer core blocks formed by the steps shown in FIG. 1, showing a final step in which the veneer core blocks are stacked to complete forming the veneer core block for plywood, and FIG. 5 is a sectional view of a core block according to another embodiment of the present invention.

DETAILED DESCRIPTION OF THE INVENTION

In FIG. 1 which shows the steps of the method of the present invention, a plurality of green veneer strips 1a, 1b, 1c, which are generally referred to by reference numeral 1, formed by cutting a thin wood sheet by means of desired cutting device (not shown) so as to have a maximum effective width are arranged side by side so that the green veneer strips are in contact in a close juxtaposed relation as shown by at (A) in FIG. 1. The green veneer strips 1 are in close contact with each other with their grains in the same direction as well shown in FIG. 1 while the same are being delivered by a conveyor device, clipper device or any other suitable devices in the direction shown by the arrows in FIG. 1.

After the green veneer strips are arranged in close contact while the veneer strips are being delivered continuously, the closely juxtaposed green strips 1 are further carried in the same direction so that four cuts or slits 2a, 2b, 2c, and 2d, which are generally referred to by reference numeral 2, are formed therein by means of cutting devices 3 each having a blade 4a, 4b, 4c, and 4d. The cutting devices 3 are positioned at predetermined positions above the path along which the green veneer strip are conveyed. The slits 2 are formed in an oblique or inclined manner with respect to the plane of the surfaces of the green veneer strips so that each of the slits has a cover or lid 5. The inclined slits are formed by obliquely positioning the blades 4a, 4b, 4c and 4d as well illustrated by the step (B) of FIG. 1.

As seen in FIG. 2, each of the cutting devices 3 has a member 6 for adjustment of the cutting depth, and the blades 4a, 4b, 4c and 4d are secured by the member 6. The cutting device 3 may be of any desired type but care should be taken that the blades are held in an inclined manner to allow to form the desired inclined slits which are inclined with respect to the surface of the green veneer strips 1. Each of the blades 4a through 4d is provided with a groove or channel (not shown) which extends from the edge to the head portion of the blades. Adjacent each of the channels in the blades is provided a tube 7 which extends from an adhesive tank, which will described, hereinafter so that an adhesive contained in the tank will supplied to the channel through the tube 7. A member 8, which is preferably of porous material such as a sponge, is positioned on the head portion of the blade to prevent the adhesive from overflowing or flowing backward. Above the blades 4a through 4d are disposed four tanks 9 which contain an adhesive agent and four bobbins 10 having strings wound thereon.

The blades 4a through 4d are positioned obliquely in such a manner that the blades 4a and 4b are inclined in one direction at about 20° so that the edges thereof face the central portion of the green veneer strips 1 whereas the other blades 4c and 4d are inclined in the other direction at about 20° so that the edges thereof face the central portion of the green veneer strips as shown in FIG. 1. Thus, once the blades 4a through 4c are fixed, the slits 2a and 2b inclined in one direction and the slits 2c and 2d inclined in the other direction are formed by conveying the closely contacted green veneer strips past the blades.

Immediately after the four inclined slits 2a through 2d are formed, or at the substantially the same time as the slits, are formed, strings 11 of synthetic or man-made fiber such as polyester or nylon wound about the bobbins 10 are fed through the above-described channels of the blades 4a through 4d to the slits 2a through 2d formed in the closely contacted green veneer strips 1. Thus, the strings 11 are continuously embedded in the slits in the veneer strips immediately after the slits are formed by the blades while the green veneer strips are continuously conveyed. The strings 11 may be of any type of man-made fibers but preferably will shrink to the same or a greater degree than the green veneer strips will shring during drying.

At substantially the same time as the strings 11 are embedded in the slits 2a through 2d, the adhesive contained in the tanks 9 is supplied through the tube 6 to the channels in the blades, and the supplied adhesive then flows into the slits 2a through 2d together with the strings 11. The strings which are fed through the aforesaid channels of the blades are embedded into the slits 2a through 2d, with the adhesive which has been supplied from the tank 9 to the channels of the blades. Thus, the strings are embedded in the slits together with the adhesive agent immediately after the blades form the slits. The adhesive agent preferably has a humidity setting characteristic which chemically reacts with the water within the green veneer strips and is cured or hardened.

The adhesive agent supplied into the slits together with the strings reacts with the water contained within the green veneer strips and becomes hardened within a relatively short period. Although it takes at least 20 – 30 seconds until the adhesive agent is hardened, the green veneer strips can be continuously conveyed to the following step such as cutting and drying without any difficulties since the strings 11 embedded in the slits 2a through 2d are firmly caught in the slits to provide a temporary or interim connection of the green veneer strips.

After the strings with the adhesive agent are embedded in the slits 2a through 2d, a similar operation is performed on the succeeding groups of green veneer strips which are closely contacted with each other in a similar manner to that described above, and then the green veneer strips are stacked so that the adhesive agent will be completely hardened as illustrated at (C) of FIG. 1 and in FIG. 4. Thus a veneer core block for plywood is completed. The stacking step allows the green veneer strips to remain still and allows a complete hardening of the adhesive agent supplied into the slits together with the strings.

The inclined slits 2a through 2d preferably have a width of 5–6mm. and a depth of one half of the thickness of the green veneer strips.

The inclined slits may be formed such that the adjacent slits are inclined in the opposite directions as illustrated in FIG. 5. Any other configuration of the slits may be made, but preferably at least one slit adjacent to the side of the green veneer strips is formed such that a base portion of the slit is nearer to the center of the green veneer strips than the opening of the slit, because the strips, after the strings with an adhesive thereon are embedded in the slits, are generally delivered to be stacked with the leading end thereof being inclined downwardly as illustrated in FIG. 4. By forming the slit as described, the stacking operation may be conducted efficiently without any hindrance since the leading end of the connected veneer strips will not hurt the portion where the slit is formed but will slide over the lid of the slit in a smooth manner. Reference numeral 12 designates a stop device, against which the connected green veneer strips are delivered when they are being stacked.

As described above, the veneer core blocks formed with a plurality of green veneer strips by the method of the present invention can be formed continuously. Further the veneer core block of the present invention presents a smooth surfaces since the green veneer strips are closely connected by means of strings and adhesive, both of which are embedded in the inclined slits. Furthermore, disadvantages of the conventional veneer core block and the method for forming same have been completely eliminated.

What I claim is:

1. In a method for forming a veneer core block for a plywood wherein thin wood sheets are cut to form a plurality of green veneer strips having a maximum effective width, the method comprising the steps of juxtaposing the green veneer strips such that said veneer strips are closely contacted side by side, forming inclined slits on the surface of said green veneer strips, embedding strings in said slits to temporarily connect the closely contacted green veneer strips, and supplying and adhesive into said slits.

2. A method as claimed in claim 1, wherein said strings are embedded in said inclined slits immediately after said slits are formed.

3. A method as claimed in claim 1, wherein said strings are coated with said adhesive before said strings are embedded in said slits.

4. A method as claimed in claim 1, wherein said adhesive has a water setting characteristic to permit an immediate hardening of the adhesive by reaction with water contained within said green veneer strips.

5. A method as claimed in claim 1, wherein the veneer core blocks are stacked before the adhesive is hardened.

6. A veneer core block for a plywood, comprising a plurality of green veneer strips contacted closely side by side, said green veneer strips having a plurality of inclined slits and strings with an adhesive within said slits, thereby connecting said green veneer strips to form a veneer core block.

7. A veneer core block for a plywood as claimed in claim 5, said slits are inclined at about 20° with respect to the surface of said green veneer strips.

8. A veneer core block for a plywood as claimed in claim 7, wherein said slits are inclined in different directions from each other.

* * * * *